US007006285B2

(12) United States Patent  
Watanabe (10) Patent No.: US 7,006,285 B2  
(45) Date of Patent: Feb. 28, 2006

(54) RANGE BINOCULARS

(75) Inventor: Naomi Watanabe, Warabi (JP)

(73) Assignee: Kamakura Koki Co., Ltd., Saitama (JP)

( * ) Notice: Subject to any disclaimer, the term of this patent is extended or adjusted under 35 U.S.C. 154(b) by 66 days.

(21) Appl. No.: 10/070,298

(22) PCT Filed: Jul. 6, 2001

(86) PCT No.: PCT/JP01/05910

§ 371 (c)(1),  
(2), (4) Date: Jul. 24, 2002

(87) PCT Pub. No.: WO02/05007

PCT Pub. Date: Jan. 17, 2002

(65) Prior Publication Data

US 2003/0002149 A1   Jan. 2, 2003

(30) Foreign Application Priority Data

Jul. 6, 2000  (JP)  ................................. 2000-4740

(51) Int. Cl.  
*G02B 23/00* (2006.01)

(52) U.S. Cl. ........................ 359/412; 359/411; 359/424

(58) Field of Classification Search ................ 359/407, 359/409, 411–412, 399, 405, 424, 408, 410, 359/413–418, 480–482; D16/133  
See application file for complete search history.

(56) References Cited

U.S. PATENT DOCUMENTS

| 4,671,165 A | * | 6/1987 | Heidmann et al. .......... 89/41.19 |
| 5,071,242 A | * | 12/1991 | Yanagisawa ................. 359/416 |
| 5,572,361 A | | 11/1996 | Kamiya et al. |

FOREIGN PATENT DOCUMENTS

| JP | 58172510 A | 10/1983 |
| JP | 8262330 A | 10/1996 |
| JP | 10300840 A | 11/1998 |
| JP | 2000066113 A * | 3/2000 |
| WO | WO 8802125 A1 * | 3/1988 |

* cited by examiner

*Primary Examiner*—Mark A. Robinson  
*Assistant Examiner*—Lee Fineman

(57) ABSTRACT

Disclosed is a pair of range binoculars that, when the pupil distance is adjusted, is free from a deviation of the optical axes and undesirable influences on the electronic parts resulting from vibration caused by the adjustment, is capable to show the measured distance in such a way as the user can see it easily without making the system complicated, and secures the brightness of the visual field where the measured distance is displayed. The range binoculars are characterized in that a main case and an attached case contain a pair of left and right observation optical systems and the pupil distance is adjusted by turning only the attached case, and that the main case accommodates laser range-finding means, and measured distance displaying means comprising LCD means for displaying a distance measured by said laser range-finding means and a displaying optical system for projecting the distance displayed by said LCD means on the reticle so that the distance is shown at a rim of the visual field.

18 Claims, 6 Drawing Sheets

Figures for Illustrating Reflections inside Porro II Prism

RANGE BINOCULARS

TECHNICAL FIELD

This invention relates to range binoculars, more particularly to range binoculars that are easy to adjust the pupil distance and capable of indicating the distance between the binoculars and the object being observed.

BACKGROUND ART

Conventional range binoculars have a pair of lens barrels, one of which includes a left observation optical system and the other of which includes a right observation optical system, and a middle bridge to which each of the barrels is connected, wherein either of the barrels can turn around the middle bridge. When the user adjusts the pupil distance, s/he turns the lens barrels around the middle bridge so as to adjust the distance between the eyepieces to his/her pupil distance.

This adjustment means turning the whole optical axes of the observation optical systems around the middle bridge, which is accompanied by a deviation of the optical axes and undesirable influences on the electronic parts resulting from vibration caused by the turning.

One of the methods of displaying a measured distance used in conventional range binoculars is directly placing an LCD showing the distance on the focal plane. Another method is brightly projecting the display of an LED onto the visual field with a relay lens using the beam splitter of an erecting prism.

However, in the former method, because the light transmissibility of an LCD is very low, the image made by the observation optical system that also displays the distance is dark compared with the image made by the other observation optical system. As a result, the image the binoculars finally make is very obscure. On the other hand, the latter method does not lower the brightness of the image made by the observation optical system that also displays the distance. Also, the distance can be displayed at the center of the visual field. Consequently, the latter method does not make the image obscure. However, it makes the system of relays complicated and requires special LEDs, which results in an increase in production cost.

The object of the present invention is to remove the deficiencies conventional range binoculars have. Specifically, the objective of this invention is to provide a pair of range binoculars that, when the pupil distance is adjusted, is free from a deviation of the optical axes and undesirable influences on the electronic parts resulting from vibration caused by the adjustment. The objective pair of binoculars is also capable to show the measured distance in such a way as the user can see it easily without making the system complicated, and secures the brightness of the visual field where the measured distance is displayed.

DISCLOSURE OF THE INVENTION

In order to achieve the aforementioned objective, the present invention provides a pair of range binoculars which comprises: a first observation optical system comprising a first optical member for forming an erecting image, a first objective optical system that determines together with said first optical member a first objective optical axis, and a first ocular optical system that determines together with said first optical member a first ocular optical axis; a second observation optical system comprising a second optical member for forming an erecting image, said second member being placed parallel with said first optical member, a second objective optical system that determines together with said second optical member a second objective optical axis, and a second ocular optical system that determines together with said second optical member a second ocular optical axis; a main case accommodating said first observation optical system and said second objective optical system; an attached case accommodating said second ocular optical system and said second optical member, said attached case being placed on said main case so that said attached case can be turned round said second objective optical axis; laser range-finding means accommodated in said main case; and measured result displaying means comprising LCD means for displaying a distance measured by said laser range-finding means, said LCD means being placed at a part off a light path formed by said first observation optical system, and a displaying optical system for projecting the distance displayed by said LCD means on the reticle so that the distance is shown at a rim of the visual field.

One of the preferred embodiments of the invention is a pair of range binoculars recited above, wherein said displaying optical system comprises a relay lens and a reflecting mirror;

said laser range-finding means comprises a laser emitter for emitting a laser beam to an object, a laser beam receiver for receiving the laser beam reflected by the object, and range-finding means for measuring the distance between the pair of binoculars and said object based on the length of time from the emission of said laser beam to the receiving thereof, wherein said laser emitter comprises a laser diode emitting an infrared ray, and a plate beam splitter or prism beam splitter placed on the second objective optical axis, said splitter reflecting the infrared ray emitted by the laser diode, whereby the laser beam is sent to said object through the second objective optical system, and said splitter transmitting visible light coming through the second objective optical system;

said first optical member is a beam splitter that separates infrared ray from visible light and takes the separated infrared ray out of the light path of said first observation optical system;

said laser beam receiver receives an infrared ray that was emitted by the laser emitter to an object, reflected by said object, sent into the light path of said first observation optical system, and separated by said first optical member; and said laser diode and said laser beam receiver are placed in the opposite side of the second observation optical system at a part off the light path formed by said first observation optical system.

BRIEF DESCRIPTION OF THE DRAWINGS

In FIGS. 1 and 2, housings such as main case 11 are cut away along the face parallel to the sheets.

DETAILED DESCRIPTION OF THE PREFERRED EMBODIMENTS

An embodiment of the range binoculars in accordance with this invention will be explained with reference to the figures hereafter.

Range binoculars 1 comprise main body 10 and attached body 20. As observation optical system, range binoculars 1 have the first observation optical system 30 comprising the first objective optical system 31, the first ocular optical system 32 and the first optical member 33, and the second observation optical system 50 comprising the second objective optical system 51, the second ocular optical system 52 and the second optical member 53. The first observation optical system and the second observation optical system are placed parallel with each other.

The first objective optical axis is determined by the first objective optical system 31 together with the first optical member 33. The first ocular optical axis is determined by the first ocular optical system 32 together with the first optical member 33. The second objective optical axis is determined by the second objective optical system 51 together with the second optical member 53. The second ocular optical axis is determined by the second ocular optical system 52 together with the second optical member 53.

Main body 10 comprises main case 11, a housing, which accommodates the first observation optical system 30 and the second objective optical system 51 of the above-mentioned optical systems or members.

Main case 11 comprises objective part 12 accommodating the first objective optical system 31 and the second objective optical system 51, and ocular part 13 accommodating the first ocular optical system 32 and the first optical member 33, with the ocular part integrated with the objective part. Main case 11, which is an integrated case of objective part 12 with ocular part 13, has a general L-shape outline in the whole entity. Ocular part 13 has a first ocular cylinder 14 accommodating the first ocular optical system 32. Objective part 12 has a hole 15 in face 16 where ocular part 13 is placed. The axis going through the center of hole 15 is in line with the optical axis of the second objective optical system.

On the other hand, attached body 20 comprises attached case 21 that accommodates the second ocular optical system 52 and the second optical member 53 of the second observation optical system 50.

Attached case 21 has a cylindrical shape, on one end face of which is mounted the second ocular cylinder 24 accommodating the second ocular optical system. The other end face 23 of the case is provided with an annular projection 22 that can be engaged with hole 15 formed in face 16 of objective part 12. When annular projection 22 is engaged with hole 15, the axis of annular projection 22 is in line with the optical axis of the second objective optical system 51. Annular projection 22 is also provided with connecting member 25. When annular projection 22 is engaged with hole 15 and face 16 of main body 11 is contacted with end face 23 of attached case 21, connecting member 25 contacts with the inner wall of main case 11 and connects main case 11 with attached case 21 so that attached case 21 turns on face 16 with annular projection 22 sliding on the periphery of hole 15.

Main body 10 includes laser emitter comprising laser diode 17 and plate beam splitter 18.

Laser diode 17 is placed in the vicinity of that wall in objective part 12 of main case 11 which is by the side of the first observation optical system 30. This laser diode emits an infrared ray perpendicularly to the optical axes of the first observation optical system 30 and the second observation optical system 50. The wavelength of an infrared ray emitted by laser diode 17 may be chosen at the designer's discretion, as long as the distance between the binoculars and the observed object can be measured by the method that will be explained hereafter. An example of the wavelength is 905 nm.

Plate beam splitter 18 is placed on the axis of the second objective optical system 51 in objective part 12 of main case 11. The splitter reflects an infrared ray emitted by laser diode 17 and sends the collimated ray through the second objective optical system 51 to the outside of range binoculars 1. The splitter, on the other hand, transmits visible light coming into the optical path formed by the second objective optical system 51 from the outside of range binoculars 1 through the second objective optical system 51, and guides the visible light to the second optical member 53. A prism beam splitter that has the same or similar function as a plate beam splitter may be used in place of plate beam splitter 18.

Each of the first objective optical system 31 and the second objective optical system 51 is comprised of a group of objective lenses made of a combination of plural lenses. The groups of objective lenses are fixed in the first objective cylinder 34 and the second objective cylinder 54 respectively. These objective optical systems may be the same as those used in conventional binoculars or range binoculars.

Each of the first ocular optical system 32 and the second ocular optical system 52 is comprised of a group of ocular lenses made of a combination of plural lenses. As explained hereinbefore, the first ocular optical system 32 is fixed in the first ocular cylinder 14 mounted on ocular part 13 of main case 11, while the second ocular optical system 52 is fixed in the second ocular cylinder 24 mounted on attached case 21. These ocular optical systems may be the same as those used in conventional binoculars or range binoculars.

Figure 5:
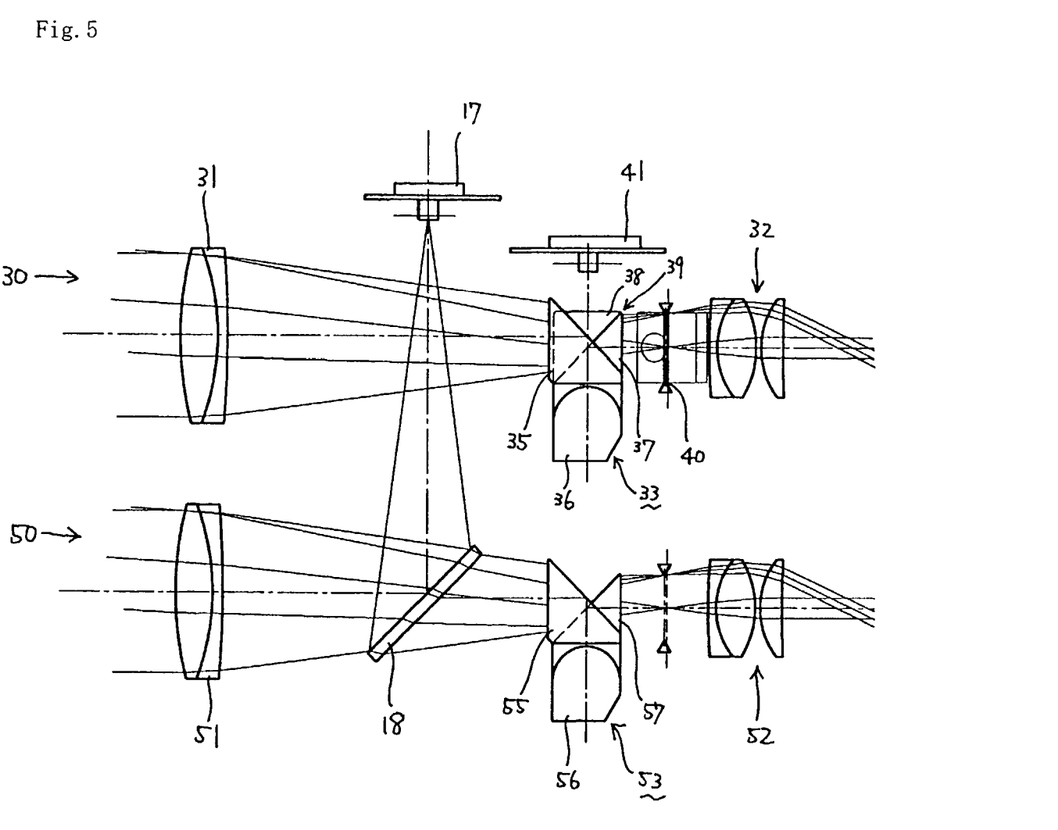
FIG. 5 is a schematic illustration that shows only the optical systems of range binoculars 1 in FIG. 1.

As shown in FIG. 5, the second optical member 53 is a known Porro II erecting prism made by a combination of the second upper prism 55, the second side prism 56 and the second lower prism 57. The second optical member 53 is placed in such a position as a ray coming through the second objective optical system enters into the second upper prism 55, the second side prism 56 and the second lower prism 57 in this order and then is sent to the second ocular optical system 52. Due to this structure of the second optical member 53, the second observation optical system 50 has the second ocular optical system 52 of which optical axis is not in line with the optical axis of the second objective optical system 51.

As shown in FIG. 5, similar to the structure of the second optical member 53, the first optical member 33 comprises a Porro II erecting prism made by a combination of the first upper prism 35, the first side prism 36 and the first lower prism 37, and further a rectangular prism 38. Rectangular prism 38 is set to the Porro II erecting prism with the bottom face thereof contacted with the bottom face of the first lower prism 37. This combination of the first lower prism 37 with rectangular prism 38 makes a beam splitter 39. Consequently, the first optical member 33 has, in addition to the same function as the second optical member 53 has, the function of a beam splitter, which transmits an infrared ray and reflects visible light. Due to these functions of the first optical member 33, of an infrared ray that is emitted by the laser diode to the outside of range binoculars 1, reflected and returned by the object, and comes into the optical path of the first observation optical system 30 through the first object optical system 31, and visible light that is reflected by the object and comes into the optical path of the first observation optical system 30 through the first object optical system 31, only the visible light is reflected by beam splitter 39 and sent to the first ocular optical system 32, while the infrared ray is transmitted by beam splitter 39 and guided to the outside of the first observation optical system 30.

Between the first optical member 33 and the first ocular optical system 32 of the first observation optical system 30 is placed reticle 40. Reticle 40 is provided with a mill scale.

Figure 1:
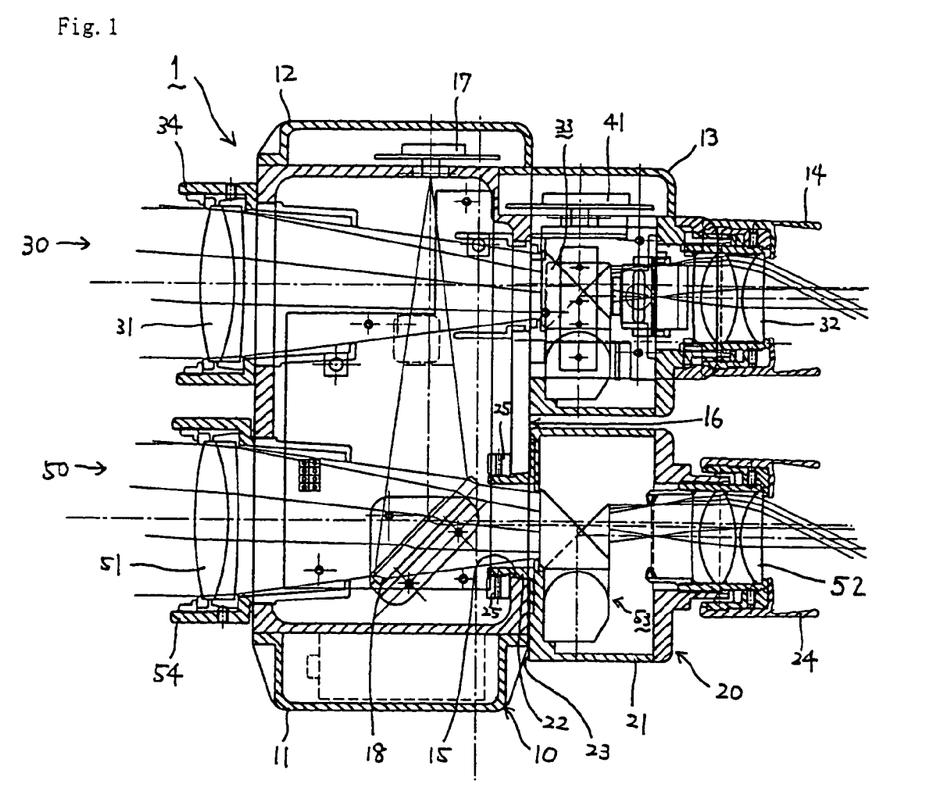
FIG. 1 is a sectional view illustrating the inside structure of a pair of range binoculars 1, which is one embodiment of the invention.

As shown in FIG. 1, main body 10 has laser beam receiver 41, which is a photodetector that receives an infrared ray separated by the first optical member 33, at a position near the inner wall on the side where laser diode 17 is placed.

Main body 10 further has range-finding means (not shown in the figures) for measuring the distance between the observer and the object based on the length of time from the emission of an infrared ray with laser emitter 17 to the receiving thereof with laser beam receiver 41. For the range-finding means may be used known means. These means are taught by, for example, Japanese Translated PCT Application Publication No. 10-512954(1998), U.S. Pat. Nos. 5,574,552, 5,612,779, 5,623,335, 5,652,651, or 5,740,952.

Figure 3:
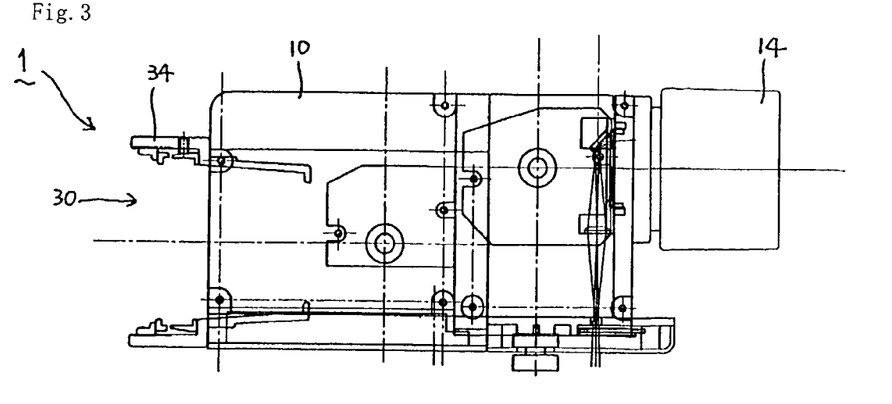
FIG. 3 is a schematic sectional view illustrating the inside structure of range binoculars 1, which is one embodiment of the invention. In this figure, housings such as main case 11 are cut away along a face perpendicular to the face explained in FIG. 2 above.
Figure 4:
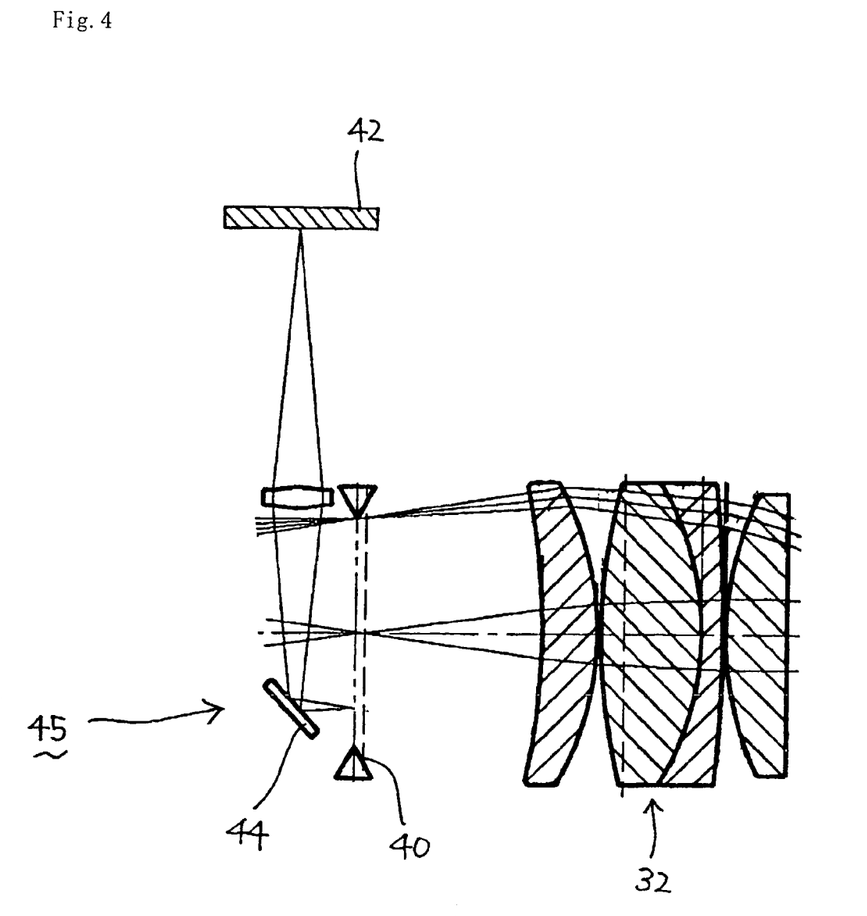
FIG. 4 is a schematic illustration that shows the functions of measured distance displaying means 45, reticle 40 and the first ocular optical system 32.
Figure 6:
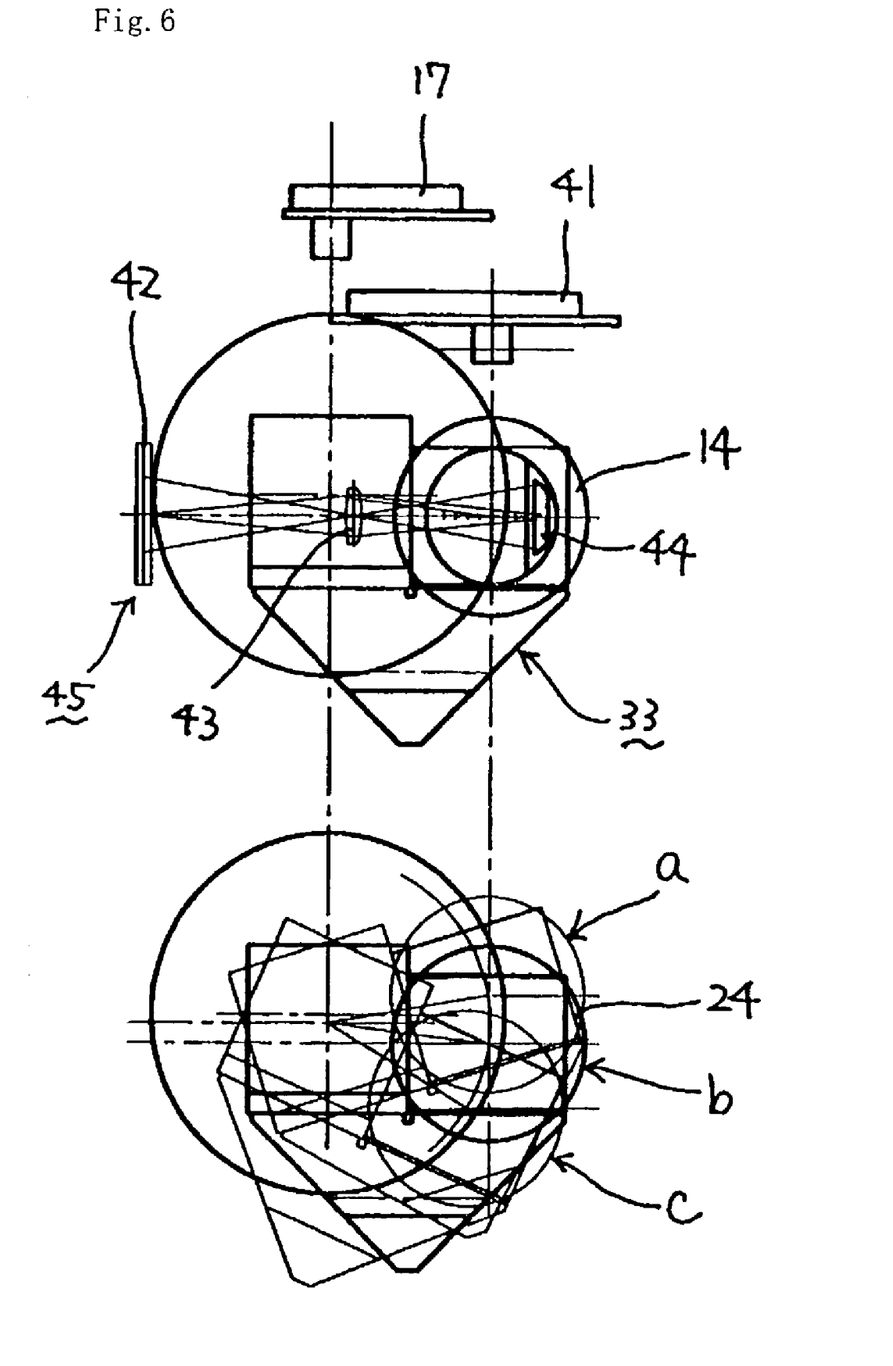
FIG. 6 is a schematic illustration that shows only the optical systems of range binoculars 1 in FIG. 2.

As shown in FIGS. 4 and 6, measured distance displaying means 45 is placed at a position above the optical axis of the first ocular optical system 32, the position being off the optical path of the first observation optical system 30. FIG. 4 is a schematic illustration of that part shown in FIGS. 1–3 which includes measured distance displaying means 45, reticle 40 and the first ocular optical system 32. Measured distance displaying means 45 comprises LCD means 42, connected with the range-finding means, for displaying the distance between the observer and the object measured by said range-finding means, and relay lens 43 and reflecting mirror 44, which comprise a displaying optical system for projecting the distance displayed by said LCD means on reticle 40. In this application the abbreviation "LCD" means liquid crystal display. An image made by LCD means 42 is projected onto reticle 40 through relay lens 43 and by reflecting mirror 44. Reflecting mirror 44 may be placed at a given position as long as it is within the visual field formed by the first ocular optical system. Preferably, the reflecting mirror should be placed at a rim of the visual field so that it does not obstruct the observed object.

Range binoculars 1, which has the aforementioned structural features, functions as follows.

Figure 2:
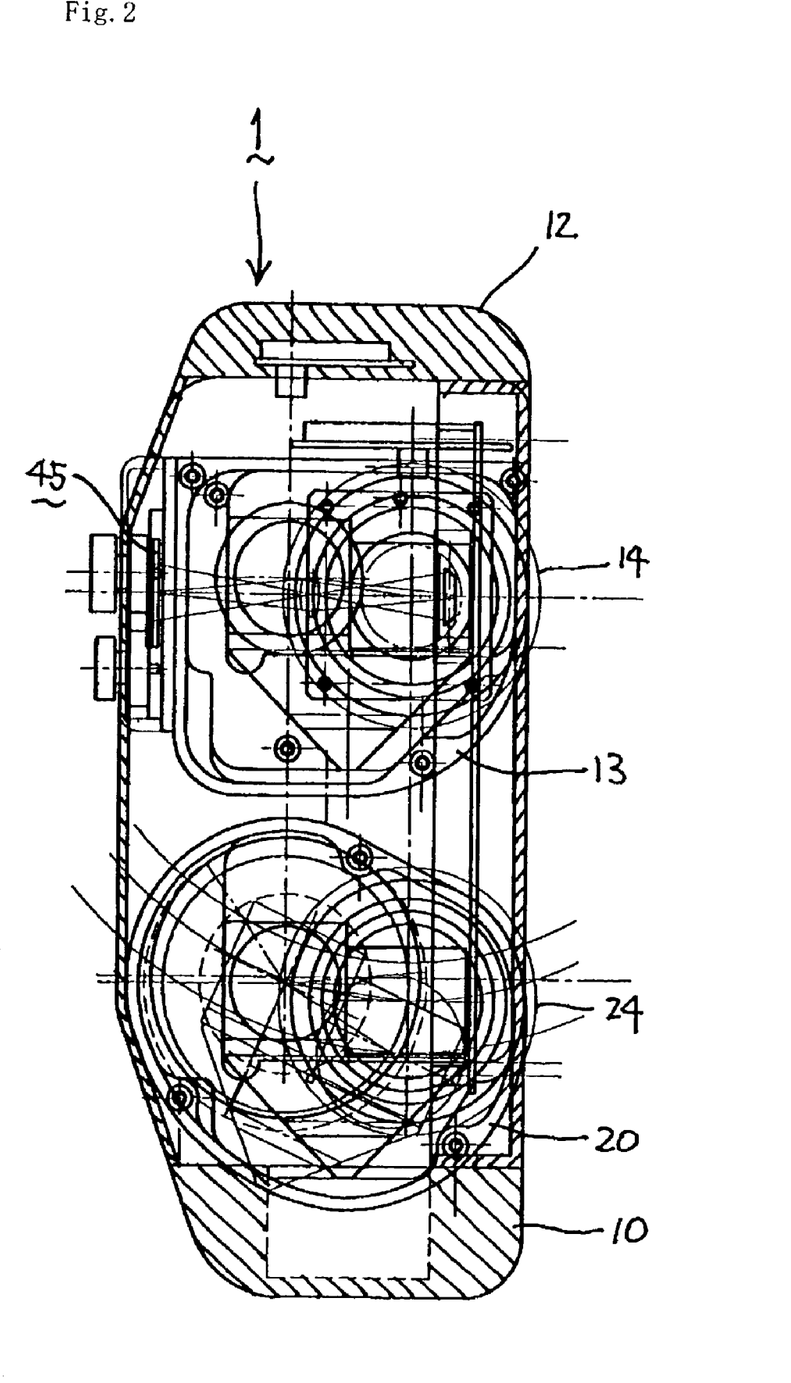
FIG. 2 is a sectional illustration that shows the inside structure viewed from the right in FIG. 1.

As shown in FIG. 2, the pupil distance is adjusted through the rotation of attached body 20. As mentioned hereinbefore and shown in FIG. 1, the axis of annular projection 22 is in line with the optical axis of the second objective optical system 50. Consequently, when the second optical member 53 and the second ocular optical system 52 are simultaneously turned through the rotation of attached body 20, rays coming along the optical axis of the second objective optical system 51 enter the second optical member 53 always by the same point. This means that the rotation of attached body 20 does not change the image obtained in the second observation optical system 50. Also, since the optical axis of the second objective optical system 51 is not in line with the optical axis of the second ocular optical system 52, when attached body 20 is rotated, the optical axis of the second ocular optical system 52 included in attached body 20 turns, drawing a circular arc of which center is on the axis of the second objective optical system 51 and of which radius corresponds to the differential between the optical axis of the second objective optical system 51 and that of the second ocular optical system 52. Since the optical axis of the second objective optical system exists in main case 11, separate from attached body 20, together with the optical axis of the first objective optical system 31 and that of the first ocular optical system 32, when attached body 20 is rotated, the distance between the optical axis of the second objective optical system 51 and that of the first ocular optical system 32 is not changed. In summary, when attached body is rotated, the distance between the optical axis of the second ocular optical system 52 and that of the first ocular optical system 32 is changed, which means the distance between the second ocular cylinder 24, accommodating the second ocular optical system 52, and the first ocular cylinder 14, accommodating the first ocular optical system 32, is changed.

In FIG. 6, the second ocular cylinder 24 may take, for example, position a, b or c, by the rotation of attached body 20. In this figure, the distance between the first ocular cylinder 14 and the second ocular cylinder 24, which is the pupil distance, is smallest when the second ocular cylinder 24 takes position a, and largest when position c. In this way, the pupil distance can be adjusted without affecting the visual field.

The user can observe an object with range binoculars 1 in the same way as with ordinary binoculars. When an object is observed with range binoculars 1, visible light reflected by the object comes into the binoculars through the first objective optical system 31 and the second objective optical system 51. The visible light coming into range binoculars 1 through the first objective optical system 31 proceeds along the optical path determined by the first objective optical system 31, and enters the first optical member 33, which has the function of a beam splitter. Since beam splitter 39 of the first optical member 33 reflects visible light as shown in FIG. 5, the visible light is reflected by beam splitter 39 and sent to the first ocular optical system 32 through the optical path determined by the first ocular optical system 32. On the other hand, the visible light coming into range binoculars 1 through the second objective optical system 51 proceeds along the optical path determined by the second objective optical system 51 to plate beam splitter 18. Since plate beam splitter 18 transmits visible light, the visible light travels through plate beam splitter 18, advances through the second optical member 53 and reaches the second ocular optical system 52 via the optical path determined by the second ocular optical system 52. In this way, the same image of the object can be made by each of the left and right optical systems.

The measurement of the distance between the observer and an object with range binoculars 1 is carried out in the following way. First, the object is brought into focus. Then, plate beam splitter 18 is irradiated with an infrared ray produced by laser diode 17. Since plate beam splitter 18 reflects infrared rays as shown in FIG. 5, the infrared ray emitted by laser diode 17 is reflected by plate beam splitter 18 and sent to the object through the second objective optical system 51. The infrared ray is reflected by the object and sent into range binoculars 1 through the first objective optical system 31. The incoming infrared ray proceeds along the path determined by the first objective optical system and enters the first optical member 33, which has a beam splitting function. Since infrared rays travel through beam splitter 39 of the first optical member 33, the infrared ray is transmitted by beam splitter 39 and guided to the outside of the first observation optical system 30. Then, the infrared ray is received and detected with laser beam receiver 41. The distance between the observing point and the object is calculated based on the length of time from the emission by laser diode 17 to the detection with laser beam receiver 41.

When the calculation is finished, a signal indicating the distance is sent to LCD means 42 included in measured distance displaying means 45, whereby the distance is displayed by LCD means 42. The image, which was produced by LCD means 42 and indicates the distance, is sent to reflecting mirror 44 through relay lens 43, reflected by reflecting mirror 44 and guided to the first ocular optical system 32. Reflecting mirror 44 is placed at a position near a rim of the visual field made by the first ocular optical system 32, which results in a distance display without interfering with the observation of an object. Also, since the distance display method of range binoculars 1 does not mar at all the visual field other than the distance displaying part with reflecting mirror 44, the image made by the first observation optical system, which also shows the distance, is not darkened.

Further, from the distance calculated in the above-mentioned method and the indication of the mill scale fixed to reticle 40 can be calculated the size of the object that is observed.

Hereinbefore has been explained one example of this invention. Needless to say, the invention is not limited to this example only but can be worked with suitable modification to the shape and structure unless it departs from the essential requirements of the invention.

Since the first observation optical system and the second observation optical system of the range binoculars in accordance with this invention are accommodated in one case, the positional relationship between these optical systems is not changed when the pupil distance is adjusted, which means pupil distance adjustment does not cause a deviation of the optical axes.

The pupil distance of the range binoculars in accordance with this invention is adjusted through the rotation of the attached body. Therefore accommodating such electronic parts as a laser diode or laser beam receiver in the main case can reduce harmful influences of that vibration on these electronic parts which is caused by the rotation for pupil distance adjustment. This feature makes possible a reliable measurement of the distance between the observer and the object being observed. Also, the electronic parts can be placed along one inner wall of the main case, which makes the adjustment of the parts easy.

Since ordinary LCDs and simple relays can be used for the distance display, the production cost of the range binoculars in accordance with the invention can be reduced.

The range binoculars of this invention can provide an image which is the same as or similar to that made by an ordinary binoculars other than the distance display part. In other words, the range binoculars do not have such defect as the image is not clearly seen because, for example, the image is darkened.

Further, by providing the reticle with a mill scale, the size of an object being observed can be calculated from the distance measured and the indication of the mill scale.

I claim:

1. A pair of range binoculars which comprises:
   a first observation optical system comprising a first optical member for forming an erecting image, a first objective optical system that together with said first optical member determines a first objective optical axis, and a first ocular optical system that determines together with said first optical member a first ocular optical axis;
   a second observation optical system comprising a second optical member for forming an erecting image, said second member being placed parallel with said first optical member, a second objective optical system that determines together with said second optical member a second objective optical axis, and a second ocular optical system that determines together with said second optical member a second ocular optical axis;
   a main case accommodating said first optical member, first objective optical system, first ocular optical system, and said second objective optical system, wherein said first optical member, first objective optical system, first ocular optical system, and second objective optical system are fixed in said main case so that they do not move when pupil distance is adjusted;
   an attached case accommodating said second ocular optical system and said second optical member, said attached case being placed on said main case so that said attached case turns round said second objective optical axis;
   laser range-finding means accommodated in said main case; and
   measured distance displaying means comprising LCD means for displaying a distance measured by said laser range-finding means, said LCD means being placed at a part off a light path formed by said first observation optical system, and a displaying optical system for projecting the distance displayed by said LCD means on a reticle so that the distance is shown at a rim of the visual field.

2. The range binoculars as claimed in claim 1, wherein said displaying optical system comprises a relay lens and a reflecting mirror.

3. The range binoculars as claimed in claim 2, wherein said reflecting mirror is placed at around a rim of the visual field so that said reflecting mirror does not substantially obstruct said light path.

4. The range binoculars as claimed in claim 3, wherein said measured distance displaying means is placed in close proximity to said reticle and above the optical axis of the first ocular optical system.

5. The range binoculars as claimed in claim 4, wherein said LCD means is positioned so that the displaying face of said LCD means is vertical to the focusing face of said reticle.

6. The range binoculars as claimed in claim 2, wherein said measured distance displaying means is placed in close proximity to said reticle and above the optical axis of the first ocular optical system.

7. The range binoculars as claimed in claim 6, wherein said LCD means is positioned so that the displaying face of said LCD means is vertical to the focusing face of said reticle.

8. The range binoculars as claimed in claim 1, wherein said laser range-finding means comprises a laser emitter for emitting a laser beam to an object, a laser beam receiver for receiving the laser beam reflected by the object, and range-finding means for measuring the distance between the binoculars and said object based on the length of time from the emission of said laser beam to the receiving thereof.

9. The range binoculars as claimed in claim 8, wherein said laser emitter comprises a laser diode emitting an infrared ray, and a plate beam splitter or prism beam splitter placed on the second objective optical axis, said splitter reflecting the infrared ray emitted by the laser diode, whereby the infrared ray is sent to said object through the second objective optical system, and said splitter transmitting visible light incoming through the second objective optical system.

10. The range binoculars as claimed in claim 9, wherein said laser diode and said laser beam receiver are placed at a part off a light path formed by said first observation optical system and in the opposite side of the second observation optical system.

11. The range binoculars as claimed in claim 10, wherein said laser diode is placed in the vicinity of a wall of said main case by the side of said first observation optical system, whereby said laser diode emits said infrared ray toward said plate beam splitter or prism beam splitter perpendicularly to the optical axes of said first and second observation optical systems.

12. The range binoculars as claimed in claim 11, wherein said plate beam splitter or prism beam splitter is placed between said second objective optical system and said second optical member.

13. The range binoculars as claimed in claim 9, wherein said plate beam splitter or prism beam splitter is placed between said second objective optical system and said second optical member.

14. The range binoculars as claimed in claim 1, wherein said first optical member is a beam splitter that separates infrared ray from visible light and takes the separated infrared ray out of the light path of said first observation optical system.

15. The range binoculars as claimed in claim 14, wherein said laser beam receiver receives an infrared ray that was emitted by the laser emitter to an object, reflected by said object, sent into the light path of said first observation optical system, and separated by said first optical member.

16. The range binoculars as claimed in claim 15, wherein said beam splitter transmits infrared ray and reflects visible light.

17. The range binoculars as claimed in claim 14, wherein said beam splitter transmits infrared ray and reflects visible light.

18. The range binoculars as claimed in claim 1, wherein said displaying optical system consists of one relay lens and one reflecting mirror.

* * * * *